(No Model.)
C. C. KELLY.
APPARATUS FOR TRAINING ANIMALS.
No. 478,513. Patented July 5, 1892.
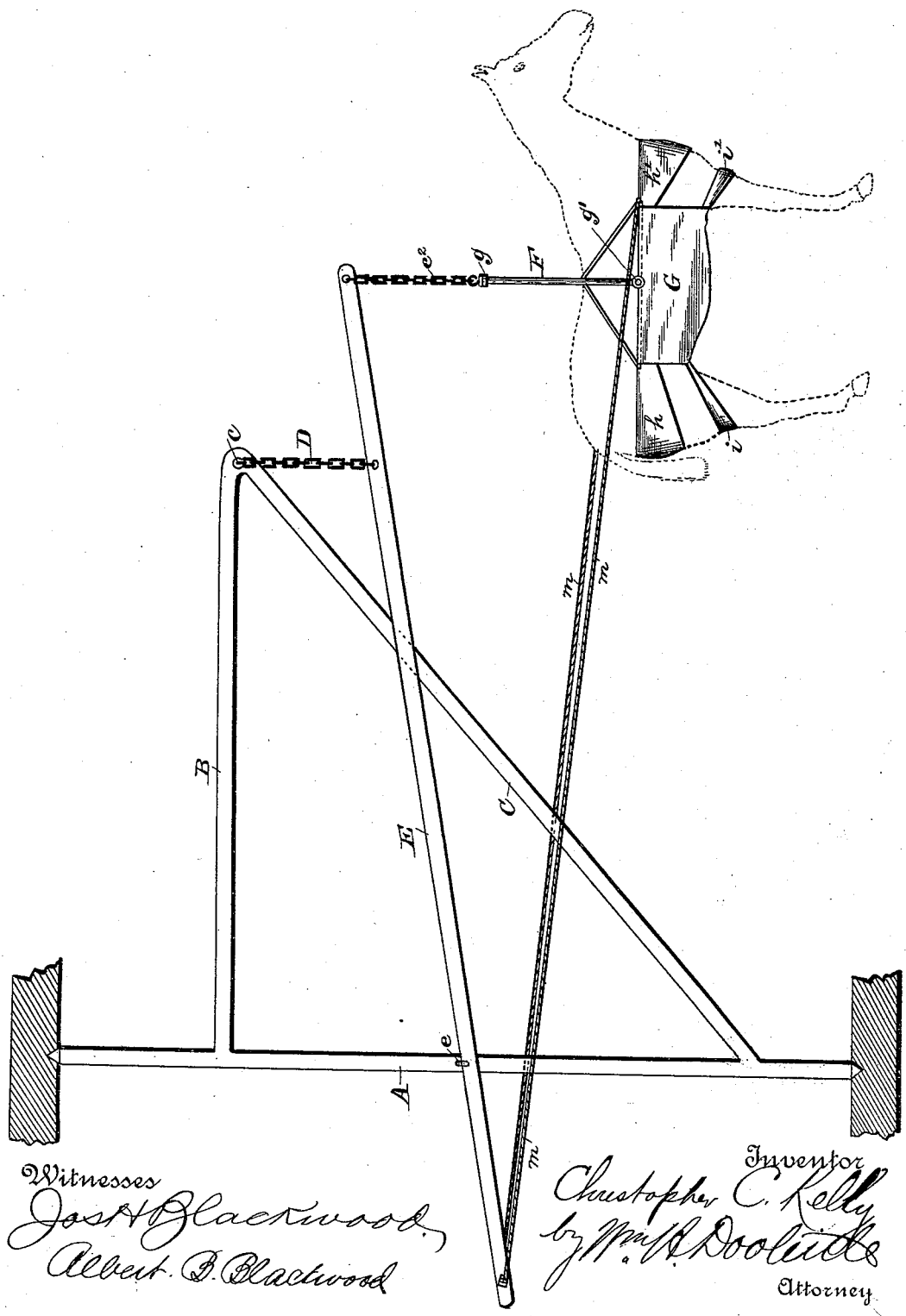
Witnesses
Jos. H. Blackwood
Albert B. Blackwood
Inventor
Christopher C. Kelly
by Wm. A. Doolittle
Attorney

United States Patent Office.

CHRISTOPHER C. KELLY, OF NEW YORK, N. Y., ASSIGNOR TO JOHN C. KELLY, OF DENVER, COLORADO.

APPARATUS FOR TRAINING ANIMALS.

SPECIFICATION forming part of Letters Patent No. 478,513, dated July 5, 1892.

Application filed July 9, 1890. Serial No. 358,131. (No model.)

*To all whom it may concern:*

Be it known that I, CHRISTOPHER C. KELLY, a citizen of the United States, residing at New York city, in the county of New York and State of New York, have invented certain new and useful Improvements in Methods of and Means for Breaking and Training Animals; and I do hereby declare the following to be a full, clear, and exact description of the invention, such as will enable others skilled in the art to which it appertains to make and use the same.

My invention relates to a means for training and breaking horses and other animals, all as particularly hereinafter described and claimed.

In the usual known methods of breaking horses the element of fear is relied upon, which is produced by violent and often brutal measures and which has the effect often of injuring the animal without producing permanent docility unless the operation has been frequently repeated. My method is a humane one, in which no brute force is resorted to to injure the animal; but it is subjected to a gentle but effective method of treatment, which will induce it to follow the directions of its master by force of newly-developed instincts or impressions. Of course it is necessary in order to well break or train a horse or other animal that it should first be mastered, and this mastery should be exercised in such manner that it will create a sudden, powerful, and permanent impression on the brain of the animal, which will efface, as it were, all previous fears, instincts, or impressions of a contrary tendency. I obtain this mastery by means of an apparatus which when used will at the same time teach and compel a horse, for instance, to perform all the work he is usually subjected to—of walking, trotting, running, backing, turning, drawing loads, &c. The means I employ are illustrated in the accompanying drawing, which is a perspective view of an apparatus for suspending a horse or other animal from the floor or ground.

A is a center revolving post having its opposite ends pointed and bearing in top and bottom sockets $b$, formed in suitable frame-work.

B is an arm or beam extending from the post A at right angles thereto and braced by a diagonal brace C, also extending from the post. The outer end of the arm B is provided with an eye C, through which is passed a chain or strong rope D. To this chain is secured a long lever E, which when not in use, or when it is desired to hold the lever in one position, rests on a cleat $e$ on the post A. At the outer end of the lever is a chain $e^2$, to which are secured by swivel two strong ropes, straps, or bands F. As shown in the drawing, these straps are adapted to support an animal by extending down on either side of it and are connected by swivel-joints $g$ to a broad strong band G placed under the horse's belly.

To further support the horse and prevent kicking and struggling while suspended, I employ two back straps $h$ $i$ and two similar front straps $h'$ $i'$, the strap $h$ to extend around the horse's buttocks and hooked to the center band, the strap $i$ placed lower down, just above the hocks, and also connected to the center band. The front strap $h'$ is a breast-strap, and the strap $i'$ is passed around the legs, and both are hooked to the center band G. A rope $m$ extends through one end of the lever and on each side of the animal and is secured in rings to the center band G for the purpose of assisting in turning the animal, as hereinafter described.

My method, with my apparatus, when applied to horses is adapted to the breaking of colts and the training of vicious horses that have been previously broken. It is performed as follows: The horse is first placed in a movable stall, (not shown, as the same is not claimed here,) which stall is on wheels and has stationary sides and front and back swing-doors, the front door being provided on the inside with a feed-trough. The stall is then pushed under the derrick above described, the center and supporting bands and straps then applied, and the center band then connected to the suspending straps, cords, or chains F. The lever E, which is pivoted to the post A, is then operated to lift the horse from his feet. The doors of the stall are then opened and the stall moved away. The horse thus suspended is now ready to be manipulated. The first movement generally is to carry the horse forward, giving him at the same time a command to go on. This movement is made by pushing the lever, which turns the center post and carries the horse forward. Then follow the commands to back or to turn in any direction, which are followed by the proper movement of the lever, carrying or turning the horse in the direction required. The rope $m$ is used in connection with the lever for guiding and turning the animal. By a proper movement or command the horse may be reversed and taught to approach the trainer. After the horse is put through these or other desired movements and commands corresponding thereto to thoroughly fill and impress his mind therewith he is then lowered to the floor or ground, the breech and arm straps loosened, if necessary, to permit him to freely move his legs, and he is then put through precisely the same movements and commands as when suspended. If he fails to obey any one command, he is immediately suspended and the movement repeated. He is then lowered and the movement again repeated when on his feet. I have found by experiment that after the animal fairly understands a movement and the corresponding command it is rarely necessary to raise him more than two or three times before he will follow the command implicitly on foot. An exception to this experience occurs when a vicious animal already broken is trained. In such case it may be necessary to repeat the operation a great number of times. By my system I have reduced a refractory broncho to the most docile and manageable condition by a few operations. When the animal is placed on his feet and has full use of his limbs, a cart or other vehicle may be attached and the animal driven at different speeds and put through the same movements as when suspended, and all the usual operations of mounting, riding, driving, hauling, and drawing may be performed while carrying out my system.

Having thus described my invention, what I claim is—

1. An apparatus for training animals, comprising a pivoted vertical post or support having a lateral arm extending therefrom, a lateral operating-lever pivoted to the post and flexibly connected to the end of the lateral arm, said operating-lever having at its front end a flexible swiveled chain or rope carrying a sling for supporting the animal, and ropes or chains connected with the sling and extending to the rear end of the operating-arm, substantially as described.

2. An apparatus for training animals, comprising a pivoted vertical post or support having a lateral arm extending therefrom consisting of a horizontal member and a diagonal brace, a lateral operating-lever pivoted to the post and flexibly connected to the end of the lateral arm, said operating-lever having at its front end a flexible swiveled chain or rope carrying a sling for supporting the animal, ropes or chains connected with the sling and extending to the rear end of the operating-arm, and bands secured to the sling and adapted to support the animal, whereby the animal may be suspended and moved and turned in different directions, substantially as described.

In testimony whereof I affix my signature in presence of two witnesses.

CHRISTOPHER C. KELLY.

Witnesses:
W. G. DOOLITTLE,
HENRY E. COOPER.